INVENTOR
JOHN LOWELL BUTLER
BY Eugene M. Eckelman
ATTORNEY

Sept. 9, 1969  J. L. BUTLER  3,465,745
BOIL-IN EXTENSION FOR KETTLES
Filed July 29, 1968  2 Sheets-Sheet 2
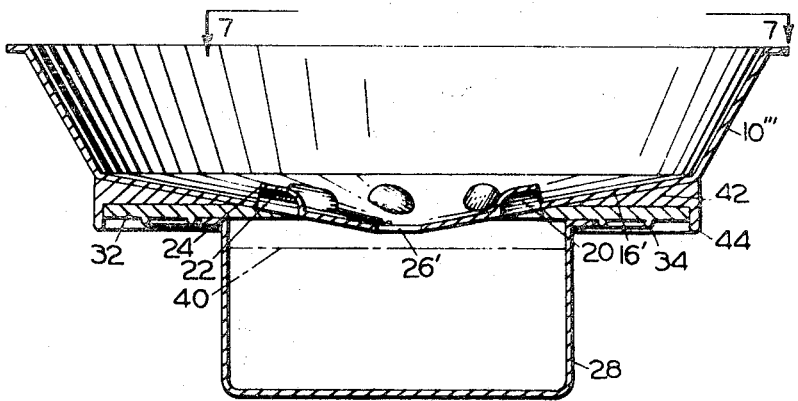
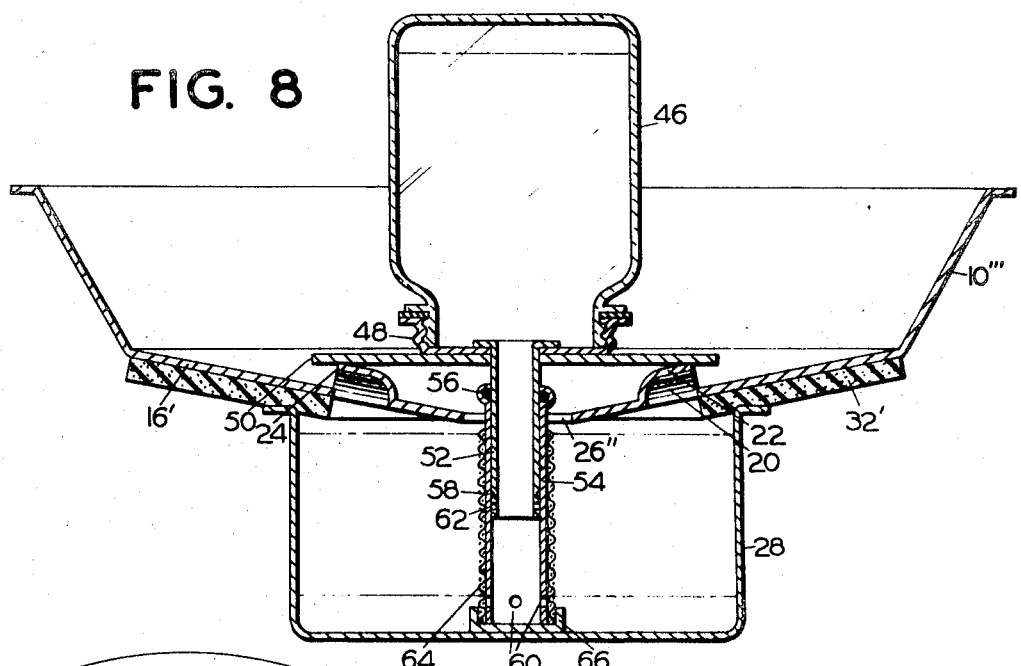
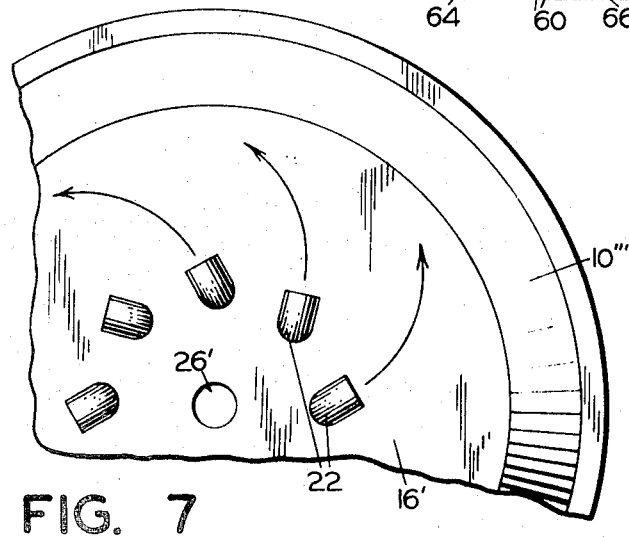
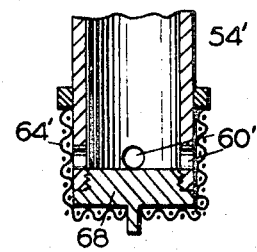
JOHN LOWELL BUTLER
INVENTOR.
BY Eugene M. Eckelman
ATTY.

United States Patent Office 3,465,745
Patented Sept. 9, 1969

3,465,745
BOIL-IN EXTENSION FOR KETTLES
John Lowell Butler, Rte. 3, Box 995,
Gresham, Oreg. 97030
Continuation-in-part of application Ser. No. 683,640,
Nov. 16, 1967. This application July 29, 1968, Ser.
No. 767,010
Int. Cl. A47j 27/58
U.S. Cl. 126—384                    12 Claims

ABSTRACT OF THE DISCLOSURE

A circumferential upright side wall portion has an open top and forms an upper extension for kettles or lids to prevent boiling over onto the stove. In one embodiment, the circumferential side wall portion is an integral part of the kettle, and in another embodiment such side wall portion is a separate member and is usable either with existing kettles or special kettles. In some of the embodiments a removable baffle plate is supported by a shoulder in the side wall portion and in another embodiment the baffle plate is integral with the upright side wall portion. All embodiments have steam outlets and a central drain inlet for returning condensed steam and any boiled over liquid to the kettle. In still another embodiment, the extension is associated with an inverted container having a spout extending therethrough and arranged to project into a kettle. The container holds a supply of water and the spout furnishes water from the container to a kettle to prevent the latter from boiling dry.

---

This application is a continuation-in-part of application Ser. No. 683,640, filed Nov. 16, 1967, and now abandoned, by John Lowell Butler for Boil-In Extension for Kettles.

This invention relates to new and useful improvements in cooking utensils and more particularly is concerned with a boil-in extension for kettles and lids which prevents contents of the kettle from boiling over onto the stove.

A primary objective of the present invention is to provide a boil-in extension for kettles and lids which has a novel structure making it efficient in its operation to prevent liquids from boiling over.

Another object of the present invention is to provide a boil-in extension for kettles and lids for cooking utensils which is simplified in construction and economical to manufacture.

Still another object of the present invention is to provide a boil-in extension for kettles and lids which in one embodiment has a portion comprising an integral part of the kettle, and in another embodiment removably seats on existing kettles.

A more particular object of the present invention is to provide a boil-in extension of the type described which forms an upper cooling chamber for a cooking utensil and which contains a substantially horizontal baffle portion or floor with outlets through which steam and boiled-over liquid can escape upwardly into the cooling chamber. The boil-in extension also includes a central drain through which condensed steam and any boiled-over liquid can flow back into the kettle.

Yet another object is to provide a boil-in extension for kettles which has water supply means in association therewith arranged automatically to furnish water to a kettle to prevent the latter from boiling dry.

The invention will be better understood and additional objects and advantages will become apparent from the following description, taken in connection with the accompanying drawings which illustrate a preferred form of the device.

Figure 1:
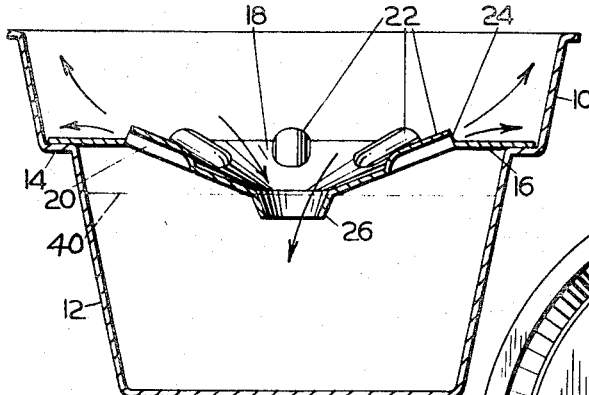
Figure 2:
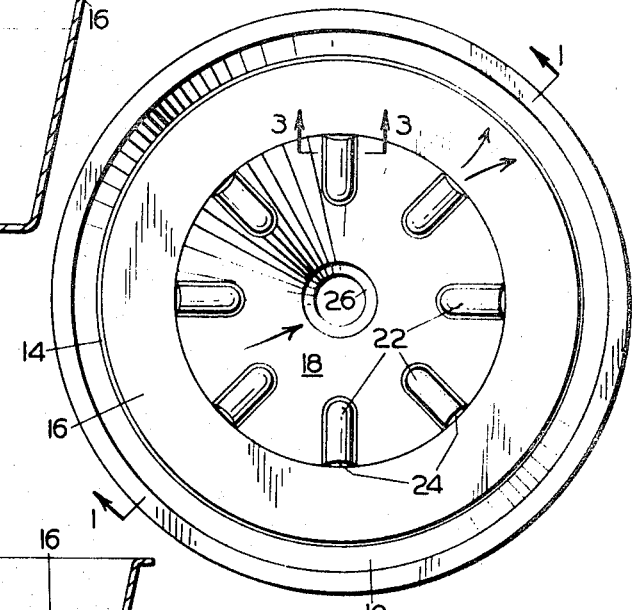
Figure 3:
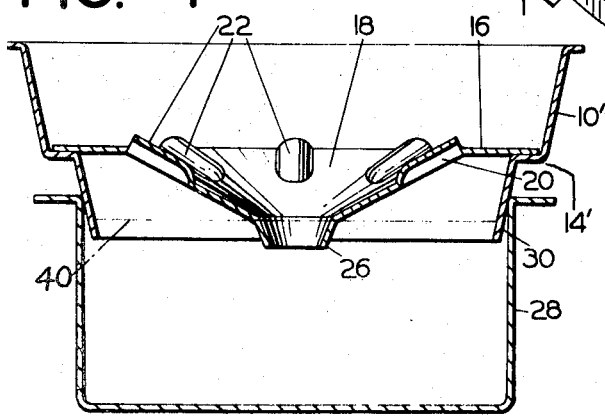
Figure 4:
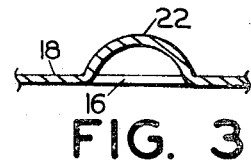
Figure 5:
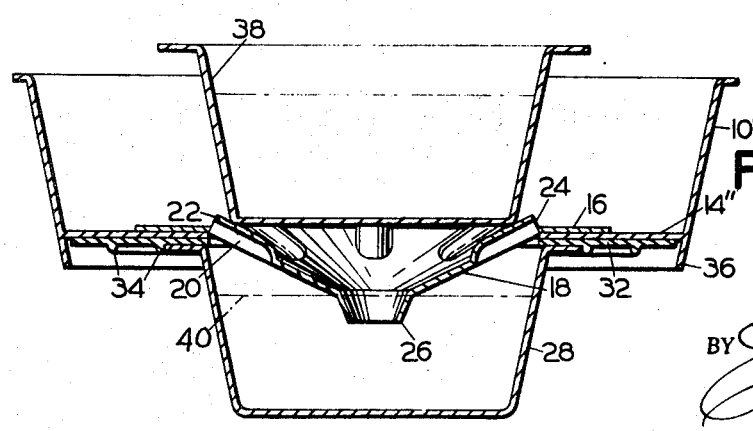

In the drawings:
FIGURE 1 is a central sectional view of a first form of the present invention, taken on the line 1—1 of FIGURE 2;
FIGURE 2 is a top plan view of the embodiment of FIGURE 1;
FIGURE 3 is an enlarged fragmentary sectional view taken on the line 3—3 of FIGURE 2;
FIGURE 4 is a central sectional view of a second form of the invention;
FIGURE 5 is a central sectional view showing still another form of the invention;
FIGURE 6 is a central sectional view of yet another embodiment of the invention;
FIGURE 7 is a fragmentary top plan view of the embodiment of FIGURE 6;
FIGURE 8 is a central sectional view of a further form of the invention wherein a container is supported on the boil-in means and has a spout for supplying water to the kettle; and
FIGURE 9 is a fragmentary enlarged sectional view of a modified form of spout of the structure of FIGURE 8.

A first form of the boil-in extension is shown in FIGURES 1, 2, and 3. In this embodiment, the numeral 10 designates a circumferential upright side wall portion which preferably, but not necessarily, is tapered inwardly at its bottom in a frusto-conical shape. In the embodiment of FIGURE 1, the side wall portion and thus a portion of the invention comprises an integral part of a kettle or container portion 12 of any suitable shape. In this embodiment, the upper end of the container portion 12 is smaller than the lower end of the side wall portion 10 to form a shoulder or ledge 14 therebetween. If desired, the shoulder 14 may merely comprise a ridge or indentation of the kettle instead of a shoulder.

The upper and lower ends of the side wall portion 10 are open, and forming a part of the boil-in extension means of this embodiment is a baffle plate or floor 16 suspended below the top and inside of the extension and of a dimension to seat on the shoulder 14. This baffle plate seats removably on the shoulder 14 and has a downwardly angled or funnel portion 18 formed therein. The upper terminal end of the funnel portion is disposed inwardly from near the outer edge of the plate 16, and a plurality of outlets 20 are provided in the baffle plate 16 at about the upper or outer termination of the funnel portion 18. Preferably, openings 20 are covered by hood portions 22 having outlet ends 24. Since the hood portions 22 are provided in the walls of the funnel portion, they are angled upwardly, and therefore steam or boiled-over liquid will be directed angularly toward the outer wall portion 10. It is apparent therefore that any steam or boiled-over liquid moving through the baffle plate will move toward the outer area of the side wall portion and be efficiently cooled, as will be discussed in greater detail hereinafter.

The funnel-shaped portion 18 of the baffle plate 16 has a drain inlet spout 26 through which condensed steam and boiled over liquid can flow back into the kettle portion 12. Escape of steam through spout 26 is checked when the level of liquid 40 in the kettle is above the lower end of this spout. This is desirable in initial hurried heating because it also reduces the flow of cool air down into the kettle.

A second embodiment is shown in FIGURE 4 comprising a circumferential side wall portion 10' which is not connected or integrated with a lower kettle portion, but instead is intended for use with existing kettles 28. In this embodiment, the side wall portion 10' has an inturned or indented portion 14' which serves as a shoulder for the baffle plate or floor 16 of identical construction to that shown in FIGURE 1. Side wall portion 10' has a bottom peripheral projection 30 for engaging existing kettles. Preferably, as shown, the projection 30 is tapered inwardly toward the bottom thereof so that the side wall portion 10' is adapted to have a wedging seating engagement within a kettle 28 for providing a seal between the two elements. In addition, such tapered construction of the projection 30 permits the application of the invention to different sized kettles.

In the embodiment of FIGURE 5, the invention comprises a peripheral side wall portion 10" having a considerably larger diameter than the other embodiments in order to be used on existing kettles of substantially all sizes. Such oversized wall portion has an inturned wall or shoulder 14" of substantial lateral dimension in order to seat on the various sizes of kettle 28. This embodiment employs a baffle plate portion or floor 16 identical to the baffle plate in the other embodiments. The baffle plate portion in FIGURE 5 need not assume the full lateral dimension of the side wall portion, but has a lateral dimension only great enough to seat on the shoulder 14".

FIGURE 5 further illustrates the use of a sealing washer or gasket 32 located under the shoulder 14" and having approximately the same lateral dimension as the shoulder. Such sealing washer provides a sealed connection between the kettle and the shoulder 14" so that all the steam and boiled-over liquid will move up through the baffle plate 16. Preferably, the sealing washer 32 is of heat-resistant semi-resilient material and has one or more depending annular ribs 34 one of which is arranged to engage approximately the outer edge of the top of the kettle 28 to prevent sideways movement of the side wall portion 10" thereon. Any number of annular ribs may be provided as desired. Sealing washer 32 may be adhered to the underside of inturned portion 14" or it may comprise a separate piece.

The side wall portion 10" of FIGURE 5 preferably has an annular projection 36 extending downwardly around the bottom of the inturned portion 14" to also prevent sideways movement of the extension on larger kettles.

If it is deemed necessary to anchor the individual side wall portions 10' and 10" on a kettle, and particularly the latter larger embodiment, a hold-down article 38, such as another kettle, may be seated on the baffle plate 16 whose raised hood portions 22 provide space between them and below the hold-down article for the return of condensed steam and boiled over liquid to the funnel 18 and its central hole 26, and thus to the cooking kettle 28 or 12 below. Where the hold-down article comprises a kettle, water may be placed therein for increasing the weight thereof. To help condense the steam and thus delay boiling dry, kettle 38 may contain cold water.

Another embodiment is shown in FIGURES 6 and 7. This embodiment of the invention also has a peripheral side wall portion 10'" but differs from the other embodiments in that the baffle plate portion 16' thereof comprises an integral part of the side wall portion. The entire portion 16' is tapered uniformly downwardly toward a central opening or drain inlet 26' and has openings 20 covered by hood portions 22 having outlet ends 24. The side wall portion 10'" of this latter embodiment extends from the baffle plate portion 16' at a greater angle than the other embodiments, thus illustrating that varied angles between these portions may be employed.

The wall portion 10'" is intended for use with existing kettles 28, and for seated engagement with different sizes of such kettles an annular sealing gasket 32 is employed having one or more depending annular ribs 34 arranged to engage the outer edge of the top of the kettle and prevent sideways movement of the boil-in means. A tapered annular filler member 42 is disposed between the baffle plate 16' and the sealing gasket 32 and has a depending flange or projection 44 at its outer edge the internal diameter of which is approximately the same as the outer diameter of the gasket 32. Filler member 42 is intended to serve as a weight for holding the lid portion on the kettle, and for this purpose such member may be molded or cast from solid metal. Since member 42 holds the lid portion down, it necessarily must be secured to the bottom of the latter, such as by any suitable form of fasteners or adhesive; or it may be an integral part of the baffle plate and its extended side wall when all are molded or cast as a unit. Sealing gasket 32 may or may not be secured to the bottom of the filler member 42. It is preferred that the bottom edge of flange 44 be disposed in a plane at least as low as the lowermost portion of baffle plate portion 16' so that the lid can be seated flat on a supporting surface when not in use.

With reference to FIGURE 8, the extension of the invention is shown in association with means to prevent the kettle 28 from boiling dry. In this embodiment, a side wall portion 10'''' is integrated with a central baffle plate portion 16' tapered uniformly downwardly to a central opening or drain inlet 26'. This embodiment has openings 20 covered by hood portions 22 as in the other embodiments. It also has an annular sealing gasket 32' secured to the under side of baffle plate portion 16' for accomplishing sealing engagement of the extension with a kettle 28.

In the embodiment of FIGURE 8, a container 46 approximating the shape of a fruit jar has a lid 48 to which is integrated a base plate 50. In an inverted position of the container, the base plate is arranged to be supported on the hoods 22 or the baffle plate portion 16', and provide additional weight to the kettle lid to insure a tight temporary seal between this lid and the kettle. Secured to the jar lid 48 is a spout 52 which in a supported position of the container 46 on the baffle plate portion 16' projects downwardly through the base plate and an enlarged drain inlet 26" so as to be immersed in the liquid of kettle 28. The purpose of the spout 52 is to allow water from container 46 to drain down into the kettle 28 when the water level in the latter reaches a boiled-down condition. Thus, the spout 52 is of a length such that the bottom end thereof will be disposed a selected distance from the bottom of kettle 28 when the container is supported thereon. When the liquid level in the kettle 28 boils down to a point below the bottom of the spout, air is admitted and water flows down from the container 46 to raise the liquid level in the kettle back to the bottom of the spout.

It is desired that the embodiment of FIGURE 8 be adapted for use with kettles of substantially all depths, and for this purpose the spout 52 may support an auxiliary spout section 54 in telescopic relation. Spout section 54 has sealing means 56 with the spout such as an O-ring which prevents entrance of air through the joint but which at the same time allows slidable adjustment of the said section 54 on the spout. In the use of the FIGURE 8 embodiment, the container is seated on the baffle plate portion 16' in its inverted relation by engagement of the base plate on top of the hood portions 22. The spout section 54 is selectively adjusted such that the bottom end is disposed at the point at which it is desired that the liquid level be maintained. Thus, when the liquid level lowers to a point below the bottom end of spout section 54, or the bottom end of the spout 52 if the section 54 is not used, air can enter the container and allow water therefrom to refill the kettle 28 to the tip of the section 54. Various length spout sections 54 may be provided as desired.

A peripheral stop groove 58 is provided in the spout 52 adjacent its lower end to form a catch or limit position for downward movement of the spout section 54. That is, the O-ring 56 will engage the stop groove to halt slidable movement of the O-ring in a downward direction, although it is to be understood that the O-ring can be forced beyond the stop groove in the event it is desired to remove the spout section 54 from the spout 52.

In a preferred construction, inlet holes 60 are provided in the spout section 54 adjacent the bottom thereof to allow the necessary air inlet and water outlet instead of using the bottom opening. Such openings would be less likely to clog than an end opening. The spout 52 is also provided with inlet holes 62 adjacent its bottom end similar to holes 60 in the section 54 so that the inlet means similarly would be disposed above the kettle bottom in the case where the section 54 is not used.

To be assured that holes 60, or holes 62 if the spout section 54 is not used, will not clog, an open top screen tube 64 is provided to telescopically fit the lower end of such section. Preferably, the lower end of tube 64 is secured, as by welding, to a base 66, that prevents steam from rising into the top water container 46 and displacing the water prematurely. The spout section 54 fits freely in the screen tube, and in mounting the assembly in a kettle to prevent the contents from boiling over as well as boiling dry, the screen may be placed on the spout section 54 prior to mounting the container 46 on the baffle plate portion 16', or preferably the screen tube is first positioned in the kettle 28 and then after the food and liquid are added, the container mounted in place while simultaneously fitting the spout section in the open top of the screen tube.

Referring to FIGURE 9, the spout section 54' may threadedly receive a buttom plug 68 and the screen tube 64' is secured to such plug. The spout section 54' has openings 60' adjacent the bottom thereof for air inlet and water outlet.

The container 46 is preferably constructed of transparent material in order that the fluid level therein can be readily inspected even from a distance.

According to the present invention, any steam or boiled-over liquid escapes upwardly through the openings 20 and is discharged radially outwardly into the side wall portion. The side wall portion, being above the heated area remains much cooler than the kettle portion and thus comprises a cooling chamber. A portion of the steam condenses and flows back into the said kettle portion through the drain opening 26, 26', 26'' to cool the liquid 40 in the kettle. Any boiled-over liquid which is forced upwardly into the extension is also cooled in the side wall portion and flows back into the kettle. Such condensed steam and boiled-over liquid are thus cooled in the upper area, and upon flowing back into the kettle produce a cooling effect on the liquid in the kettle and prevent such liquid from boiling too vigorously. The hood portions 22, being directed angularly outwardly toward the wall portion will insure a maximum condensation of the steam and cooling to any boiled-over liquid. The extension of this invention may be constructed of a material having good heat dissipating qualities, such as aluminum, in order to produce the best cooling effect, and each embodiment is tapered so that a number of them can be nested for shipment and storage.

It is to be understood that the forms of my invention herein shown and described are to be taken as preferred examples of the same, and that various other changes in the shape, size and arrangement of parts may be resorted to without departing from the spirit of my invention or the scope of the subjoined claims.

Having thus described my invention, I claim:
1. A boil-in extension for kettles comprising
  (a) a circumferential upright side wall portion having an open top end,
  (b) a transverse baffle plate extending inwardly from said side wall portion at a point below the top of the latter,
  (c) means defining at least one outlet opening in said baffle plate whereby steam and boiling liquid from a kettle can move upwardly into said circumferential side wall portion, said circumferential wall portion serving as a cooling chamber,
  (d) said outlet openings being located between the outer edge and the drain opening of said baffle plate and being defined by radially extending hood portions directing steam and boiling liquid outwardly toward said upright side wall portions,
  (e) and means defining a drain opening in said baffle plate disposed substantially centrally thereof,
  (f) a portion of said baffle plate being angled downwardly toward the center whereby the condensed steam and boiled over liquid are arranged to drain down through said drain opening.

2. The boil-in extension of claim 1 wherein said hood portions extend upwardly above the surface of said baffle plate.

3. The boil-in extension of claim 1 including
  (a) support means on said side wall portion,
  (b) said baffle plate being removably supported on said support means,
  (c) and at least two of said outlet openings located between the outer edge and the drain opening of said baffle plate,
  (d) said hood portions extending upwardly above the surface of said baffle plate.

4. The boil-in extension of claim 1 wherein
  (a) said baffle plate is integrated with said circumferential side wall portion,
  (b) a sealing gasket under said baffle plate of a diametral size arranged to engage kettles of different sizes,
  (c) projections on the lower surface of said gasket arranged to engage the upper edge of a kettle for holding the baffle plate against lateral movement on such kettle,
  (d) and a downwardly extending projection around the outer bottom portion of said side wall portion for additionally holding the latter against lateral movement on a kettle.

5. The boil-in extension of claim 1 wherein the baffle plate has an outer rim extended upward and outward to form the circumferential upright side wall portion as an integral part thereof.

6. The boil-in extension of claim 1 including weight means on said baffle plate for holding it on a kettle.

7. The boil-in extension of claim 1 including a spout extending down from said drain opening, said spout having a valveless opening therethrough and being of a length arranged to project into a kettle on which said baffle plate is operative whereby to allow condensed steam and boiled over liquid to drain down through said drain opening and also to prevent escape of steam up through said drain opening when the liquid level in the kettle is above the bottom of said spout.

8. The boil-in extension of claim 1 wherein
  (a) said baffle plate is arranged to seat freely on a kettle,
  (b) said boil-in extension also including weight means secured to the bottom surface of said baffle plate at the angled portion of the latter,
  (c) said weight means assuming a taper approximating the angle of the angled portion of baffle plate whereby the bottom surface of said weight means is substantially horizontal,
  (d) and a sealing gasket engageable with the undersurface of said weight means arranged to engage the upper portion of a kettle for providing sealing engagement of the baffle plate on a kettle.

9. The boil-in extension of claim 1 including
  (a) a sealing gasket engageable with the undersurface of the baffle plate and arranged to engage the upper portion of a kettle for providing sealing engagement of the baffle plate on a kettle,
  (b) weight means consisting of a container for holding liquid and arranged to be seated on said baffle plate in inverted relation,
  (c) and a spout on said inverted container arranged to project downwardly through said drain opening,
  (d) said spout having a bottom closed end and having an opening through its side wall adjacent the lower end thereof, (e) said spout being of a length such that said opening therein is disposed a selected distance from the bottom of a kettle with which the boil-in extension is associated, whereby liquid in said container is arranged to drain down into the kettle whenever the water level in the kettle is below the said opening of the spout to prevent the kettle from boiling dry.

10. The boil-in extension of claim 9 wherein said spout includes a telescoping section to vary the length thereof.

11. The boil-in extension of claim 9 including screen means on said spout to prevent plugging of said opening.

12. A boil-in extension for kettles comprising (a) a circumferential upright side wall portion having an open top end, (b) a transverse baffle plate extending inwardly from said side wall portion at a point below the top of the latter, (c) means defining at least one outlet opening in said baffle plate whereby steam and boiling liquid from a kettle can move upwardly into said circumferential side wall portion, said circumferential wall portion serving as a cooling chamber, (d) said outlet openings being located between the outer edge and the drain opening of said baffle plate and being defined by radially extending hood portions directing steam and boiling liquid outwardly toward said upright side wall portions, (e) and means defining a drain opening in said baffle plate disposed substantially centrally thereof.

References Cited

UNITED STATES PATENTS

| | | | |
|---|---|---|---|
| 94,679 | 9/1869 | Watkins | 126—384 |
| 909,284 | 1/1909 | Colling | 126—381 |
| 1,341,731 | 6/1920 | Berger | 126—384 |
| 1,461,366 | 7/1923 | Mulford et al. | 126—384 |
| 1,477,667 | 12/1923 | Schluesselburg. | |
| 1,546,190 | 7/1925 | Barish | 126—384 |
| 1,676,146 | 7/1928 | Krafft. | |
| 2,127,988 | 8/1938 | Tarrant. | |
| 2,348,452 | 5/1944 | Christopher. | |
| 2,488,215 | 11/1949 | Mayne. | |
| 2,594,868 | 4/1952 | Caserta | 126—384 |

FOREIGN PATENTS

| | | |
|---|---|---|
| 23,553 | 1914 | Great Britain. |
| 184,584 | 1/1937 | Switzerland. |
| 614,270 | 12/1960 | Italy. |

FREDERICK L. MATTERN, Jr., Primary Examiner

ROBERT A. DUA, Assistant Examiner